(No Model.)
W. COBB.
SULKY ATTACHMENT FOR PLOWS.
No. 375,868. Patented Jan. 3, 1888.
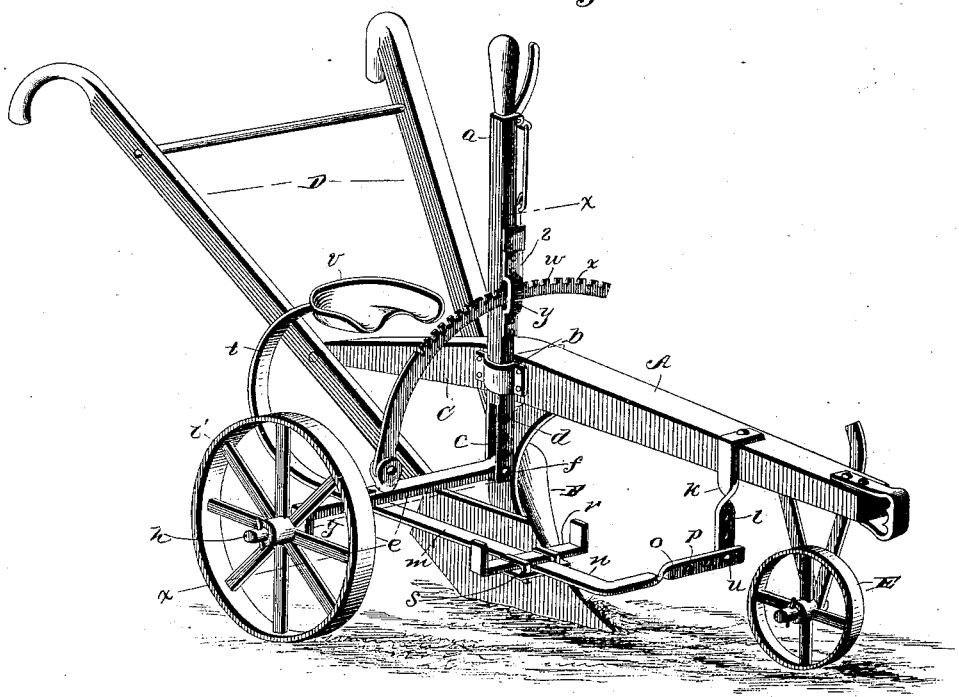
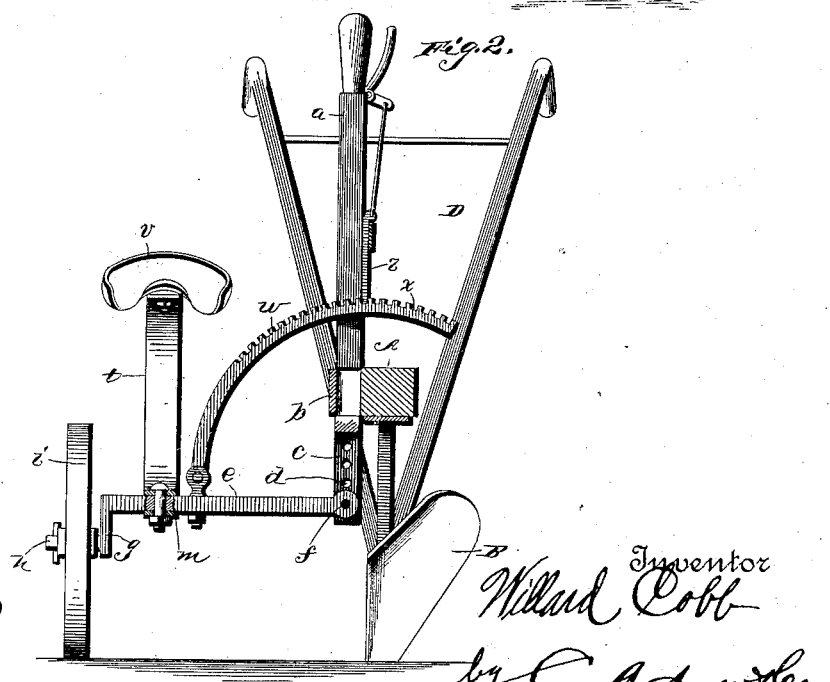
Witnesses
Inventor
Willard Cobb
by C. A. Snow & Co.
Attorneys

UNITED STATES PATENT OFFICE.

WILLARD COBB, OF DECATUR, MICHIGAN.

SULKY ATTACHMENT FOR PLOWS.

SPECIFICATION forming part of Letters Patent No. 375,868, dated January 3, 1888.

Application filed September 6, 1887. Serial No. 248,967. (No model.)

*To all whom it may concern:*

Be it known that I, WILLARD COBB, a citizen of the United States, residing at Decatur, in the county of Van Buren and State of Michigan, have invented a new and useful Improvement in Sulky Attachments for Plows, of which the following is a specfication.

My invention relates to an improvement in sulky attachments for plows; and it consists in the peculiar construction and combination of devices, that will be more fully set forth hereinafter, and particularly pointed out in the claims.

In the accompanying drawings, Figure 1 is a perspective view of a plow provided with my improved sulky attachment. Fig. 2 is a vertical transverse sectional view taken on the line $x\ x$ of Fig. 1.

A represents the beam of an ordinary plow.
B represents the share thereof.
C represents the standard.
D represents the handles, and E represents the caster-wheel at the front end of the beam.

The object of my invention is to provide a sulky attachment which is adapted to be secured to a plow, and thereby enable the plowman to ride when the plow is in operation, and to further provide devices whereby the plow may be as readily guided and controlled by the plowman as though he were grasping the handles and walking in rear of the plow in the usual way.

$a$ represents a vertical lever, which is secured at a suitable distance from its lower end to the land-side side of the plow-beam by means of a clip-bracket, $b$. The lower end of the said lever, which extends below the plow-beam, is provided with a vertical transverse open slot, $c$, and aligned openings $d$ are made in the lower end of the lever and communicating with the said slot.

$e$ represents an axle-bar, which has its inner end pivoted on a bolt, $f$, that is adapted to be secured in either of the openings $d$. The outer end of the said axle-bar is bent downward to form a bracket, $g$, from which projects a spindle, $h$, on which is journaled a supporting-wheel, $i$, of suitable size and diameter. The axle-bar projects at right angles from the plow-beam and is arranged on the land-side side thereof.

$k$ represents a depending standard or hanger, which is secured to the inner side of the plow-beam at a suitable distance from the front end thereof and has a vertical series of adjusting-openings, $l$.

$m$ represents a bar of metal, which is bent substantially at right-angles, so as to form the side arm, $n$, and the front arm, $o$. The said arm $o$ is provided with a series of openings, $p$.

$r$ represents a foot-rest, which is secured on the arm $n$ by means of a clip-bolt, $s$, the said foot-rest being thereby rendered adjustable on the arm $n$.

$t$ represents a curved spring-arm, which has its lower end bolted to the upper side of the axle-bar, near the outer end thereof. The rear end of the arm $n$ is bolted under the outer end of the axle-bar $e$. A bolt, $u$, extends through one of the openings $p$ of the arm $o$ and through one of the openings $l$ of the hanger $k$, and serves to secure the front end of the bar $m$ to the hanger at any desired lateral and vertical adjustment. On the upper end of the spring $t$ is secured a suitable seat, $v$, for the driver.

$w$ represents a curved arm, which has its outer end pivotally connected to the axle-bar near the outer end thereof. The said curved arm is provided on its upper edge with a series of notches, $x$, and the inner end of the said arm passes through a slot which is formed between a keeper, $y$, that is secured on the front side of the lever $a$ and the opposing side of the said lever.

$z$ represents a vertically-movable detent-bolt, which is guided in suitable ways on the front side of lever $a$, and is adapted to engage either of the notches $x$, so as to secure the lever to the arm $w$ at any desired inclination.

The operation of my invention is as follows: The plowman sits on the seat $v$ and directs his team with one hand and grasps the lever $a$ with the other hand. In order to guide the plow out of the way of obstructions or around corners in turning at the end of the furrow or in the corners of a field, the plowman disengages the bolt $z$ from the notches $x$ in the arm $w$ and inclines the plow in either direction in the furrow by means of the lever $a$. The depth at which the plow is run may be regulated by attaching the axle-bar $e$ to the lever $a$ at the correct vertical adjustment by means of the openings $d$ and the bolt $f$ and by attaching the front end or arm $o$ of the bar $m$ to the hanger $k$ at the correct vertical adjustment by means of the bolt, as before described. By adjusting the arm $o$ laterally on the hanger the plow may be so arranged as to avoid side draft.

A sulky attachment thus constructed may be used in connection with any common form of plow and will be found of great practical utility.

Having thus described my invention, I claim—

1. The combination of the plow, the lever $a$, attached to the plow-beam and having its lower end provided with the openings $d$, the hanger $k$, attached to the plow-beam near the front end thereof and having the openings $l$, the axle $e$, having its inner end pivoted to the lever by a bolt passing through one of the openings $d$ and having the wheel $i$ at the outer end, the bar $m$, having its rear end secured to the axle and having the front end bent inward at right angles, provided with the openings $p$ and secured to the hanger by a bolt passing through one end of the openings $p$ and $l$, and the arm $w$, connecting the axle to the lever $a$ and adjustably secured to the latter, substantially as described.

2. A sulky attachment for plows, comprising the lever $a$ and means to secure the same to the plow-beam, the axle $e$, having its inner end pivoted to and vertically adjustable in the lower end of the lever $a$, the wheel $i$ at the outer end of the said axle, the hanger $k$, adapted to be attached to the plow-beam in advance of the lever, the bar $m$, having its front end hinged to the hanger and vertically and laterally adjustable thereon, the rear end of the said bar being attached to the axle, and the arm $w$, connecting the axle to the lever $a$ and adjustably secured to the latter, for the purpose set forth, substantially as described.

In testimony that I claim the foregoing as my own I have hereto affixed my signature in presence of two witnesses.

WILLARD COBB.

Witnesses:
J. G. PARKHURST,
C. A. CRANE.